Nov. 14, 1944. N. J. SMITH 2,362,729
REFRIGERATING APPARATUS
Filed Jan. 4, 1934 2 Sheets-Sheet 1

Nelson J. Smith, INVENTOR
BY Newen Hardman & John
ATTORNEYS

Nov. 14, 1944.  N. J. SMITH  2,362,729
REFRIGERATING APPARATUS
Filed Jan. 4, 1934  2 Sheets-Sheet 2
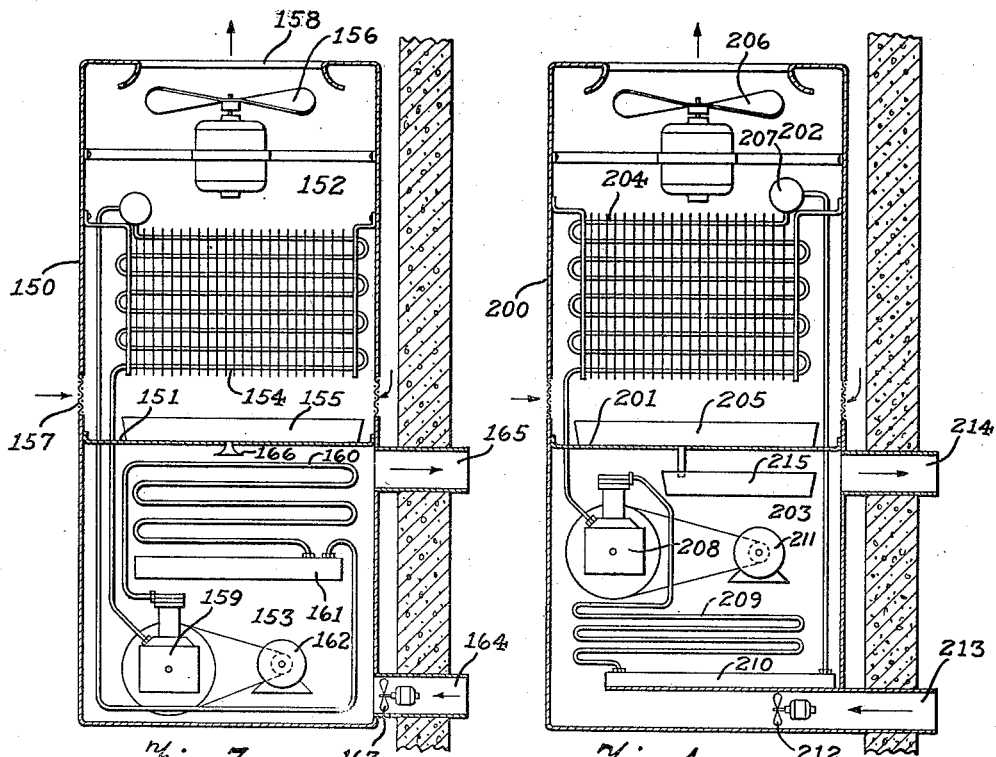
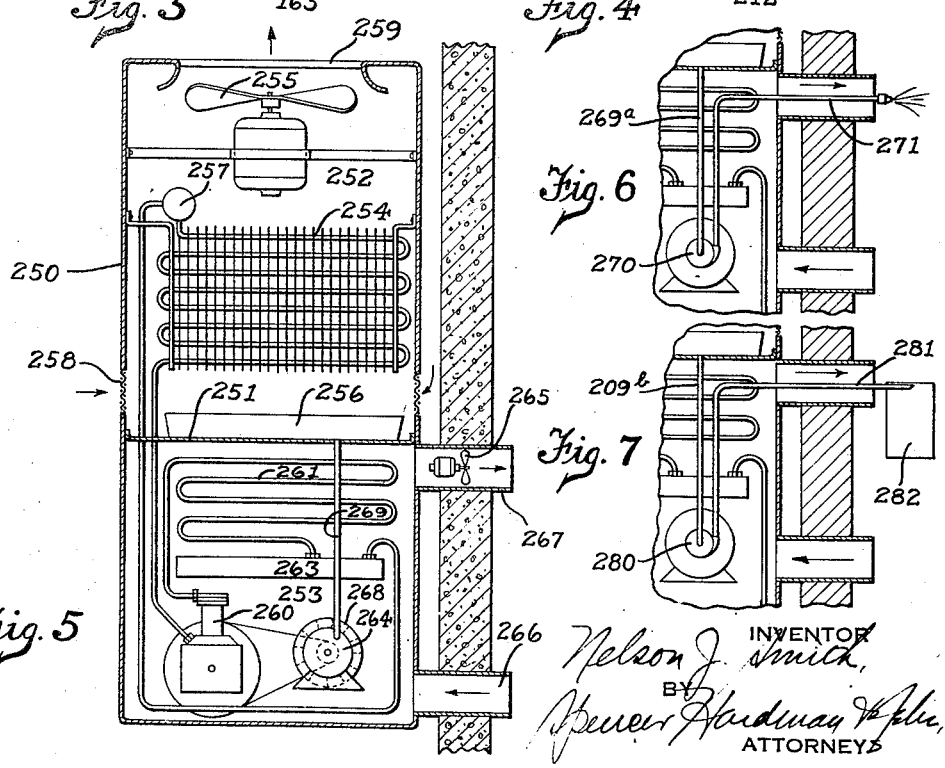

Patented Nov. 14, 1944

2,362,729

UNITED STATES PATENT OFFICE 2,362,729

REFRIGERATING APPARATUS

Nelson J. Smith, Dayton, Ohio, assignor to General Motors Corporation, Dayton, Ohio, a corporation of Delaware Application January 4, 1934, Serial No. 705,187

8 Claims. (Cl. 62—129)

This invention relates to refrigerating apparatus. More particularly the invention relates to improvements in air conditioners of the self-contained type, which are adapted to be placed in rooms where central refrigerating installations are not conveniently available.

It is among the objects of this invention to provide improved and simple means for disposing of the moisture extracted from the air in this type of air conditioning apparatus.

Further objects and advantages of the present invention will be apparent from the following description, reference being had to the accompanying drawings, wherein a preferred form of the present invention is clearly shown.

In the drawings:

Figs. 3, 4 and 5 are views also similar to Fig. 1, but also showing other modifications; and Figs. 6 and 7 show details of further modifications.

Figure 1:
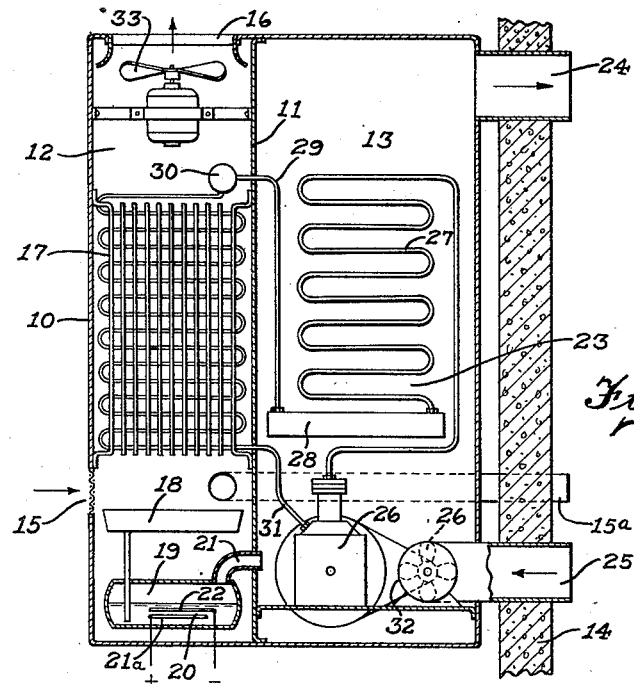
Fig. 1 is a vertical cross-sectional view, somewhat diagrammatic, of one form of my invention.

In practicing my invention, a complete air conditioning apparatus is preferably enclosed in a unitary casing 10 divided by an insulating partition 11 to form an air conditioning passageway 12 and heat dissipating passageway 13. The air conditioning apparatus is adapted to condition the air in an enclosure, such as a room, a wall of which is fragmentarily indicated at 14. Air from the enclosure enters the air conditioning apparatus at 15, passes through the air conditioning passageway 12 and is discharged back into the enclosure through the opening 16. If desired, a certain portion of air may also be introduced from outside of the enclosure into the passageway 12 through the fresh air intake pipe 15a. The air to be conditioned, and passing through the passageway 12, is cooled by coming in contact with a heat absorbing unit 17, preferably in the form of a volatile refrigerant evaporator, where moisture is generally extracted from the air being conditioned for the enclosure, because the air is generally chilled below its dew point in passing in contact with the surfaces of the evaporator. The moisture thus extracted is gathered in a drain means 18, preferably in the form of a pan underneath the evaporator, from whence the moisture flows by gravity into an insulated evaporating container 19. Here the moisture is evaporated by heating means separate from the heat dissipating unit hereinafter to be described. This heating means preferably takes the form of an electric heater 20, vapor thus produced being eventually discharged to the exterior of the enclosure through the medium of the pipe 21 which discharges the vapors into the heat dissipating air stream hereinafter to be more fully described.

The electric heater 20 may be of any suitable type. However, I prefer to use an electric heater which is automatically controlled in accordance with the level of the water in the receptacle 19. Thus the heater includes a lower conducting plate 21ᵃ and an upper conducting plate 22 which are connected respectively to electrical leads as indicated. When the moisture rises and contacts with the upper plate 22, an electric circuit is established through the heater by electrolytic action, and the water is heated and evaporated because of the electrical resistance involved. When the level falls below the upper plate 22 the circuit is broken and the heating action ceases.

The heat absorbing unit 17 is connected to a heat dissipating unit 23. This latter unit dissipates the heat which was absorbed by the unit 17 into a heat dissipating air stream which is discharged to the exterior of the enclosure through the pipe 24. Preferably this heat dissipating air stream flows from the exterior of the enclosure through the pipe 25 under the propelling force of a blower 26 which causes the air stream to pass through the passageway 13 and be discharged through the pipe 24 carrying with it the water vapor from receptacle 19 heretofore described. If desired, the pipes 24 and 25 may be connected to a window of the enclosure, or may be connected to openings especially made for them.

In this particular embodiment, the heat dissipating unit 23 takes the form of a compressor 26 which forwards compressed refrigerant to a condenser 27 from whence the condensed refrigerant flows to a receiver 28 and through a pipe 29 to an automatic expansion valve 30 to the evaporator 17 and back through the pipe 31 to the compressor 26. The compressor 26 is driven by a motor 32 which also may drive the blower 26 as indicated. In addition, an electrically driven blower 33 may be provided to circulate the stream of air through the passageway 12. The electric motors shown may be operated by any suitable automatic control responsive to conditions in the enclosure or room, such as a thermostat, humidostat, or both. In addition, suitable manual switches may be provided, as desired.

Figure 2:
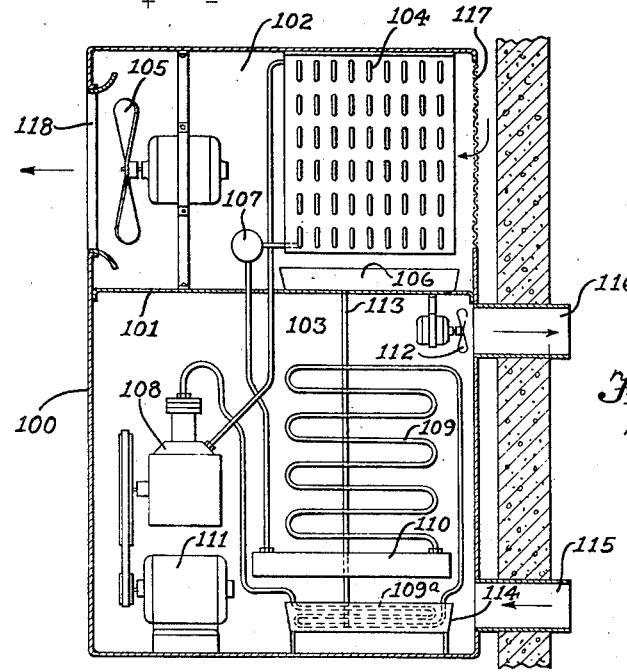
Fig. 2 is a view, somewhat similar to Fig. 1, but showing another embodiment of my invention.

In the modification shown in Fig. 2, a casing 100 is separated by a partition 101 into the air conditioning passageway 102 and the heat dissipating passageway 103. A heat absorbing unit 104, in the form of a finned evaporator is placed in the passageway 102 together with a motor-driven fan 105 and the moisture drain means 106, and an expansion valve 107 is also provided. The heat dissipating passageway 103 contains the compressor 108, condenser 109, receiver 110, together with the compressor motor 111 and an electrically driven blower 112. The parts thus far described function substantially the same as the corresponding parts in Fig. 1. In this case, however, the moisture from the drain 106 is placed in contact with a portion 109a, of the condenser by which it is evaporated. In this particular embodiment a pipe 113 permits the moisture to flow by gravity into a pan 114 in which the portion 109a of the condenser is placed. Air intake pipe 115, and the air discharge pipe 116 connect the passageway 103 with the exterior of the enclosure, while the air intake 117 and the discharge opening 118 connect the passageway 102 with the interior of the enclosure. The heat dissipating air stream carries the moisture evaporated from the body of water in pan 114 to the exterior through pipe 116.

In the modification shown in Fig. 3, the casing 150 is divided by the insulating partition 151 into an air conditioning passageway 152 and a heat dissipating passageway 153. Passageway 152 contains a heat absorbing unit 154, the drain means 155, an electrically driven blower 156, an intake passage 157 and an air discharge passage 158 connected with the enclosure or room. The heat dissipating passageway 153 contains the usual refrigerant liquefying or heat dissipating unit in the form of the compressor 159, condenser 160, receiver 161 and motor 162. An electrically driven blower 163 forces air from the exterior through the pipe 164 and discharges it through the pipe 165 to the exterior. In this modification, the moisture gathered in the pan 155 is sprayed or dripped by gravity through the spray-head 166 directly on the condenser 160 where it is turned into vapor and is discharged in the form of vapor to the exterior through the pipe 165.

In the form shown in Fig. 4 the casing 200 is divided by the insulating partition 201 into the air conditioning passageway 202 and air dissipating passageway 203. The passageway 202 contains the heat absorbing unit 204, the drain means 205, the electrically driven blower 206 and the automatic expansion valve 207. The heat dissipating passageway 203, contains the heat dissipating unit in the form of a compressor 208, condenser 209, receiver 210, motor 211 and electrically driven blower 212. Air from the exterior flows through the pipe 213 through the passageway 203 and back to the exterior through the pipe 214. The moisture gathered in the pan 205 flows by gravity to the pan 215 where it is evaporated by the heat from the heat dissipating unit and is discharged in the form of vapor through the pipe 214 to the exterior of the enclosure.

In the form shown in Fig. 5, the casing 250 is divided by the heat insulating partition 251 into the air conditioning passageway 252 and heat dissipating passageway 253. The passageway 252 contains the heat absorbing unit 254, the electrically driven fan 255, the drain means 256 and the automatic expansion valve 257. Air enters from the enclosure through the opening 258 and is discharged to the enclosure through the opening 259. The heat dissipating passageway 253 contains the usual heat dissipating unit or refrigerant liquefying unit, in the form of a compressor 260, condenser 261, receiver 263, motor 264 and motor-driven blower 265 for causing air to flow through the pipe 266 from the exterior into the passageway 253 and back to the exterior through the pipe 267. The motor 264 which drives the compressor 260 is provided with a rotary sprayer 268. The drain means 266 is connected by a pipe 269 with the rotary sprayer 268 in such a manner that the moisture extracted from the air in the enclosure is discharged in the form of a spray into the enclosure 253 and from thence to the exterior through the pipe 267.

In the form shown in Fig. 6, the structure shown in Fig. 5 is modified in that the rotary sprayer 268 is replaced by a rotary pump 270, which receives moisture through the pipe 269a and discharges it through the pipe 271 in the form of a spray directly to the exterior. The spray thus promotes evaporation of the moisture.

In the form shown in Fig. 7, the structure shown in Fig. 5 is modified by changing the rotary sprayer 268 into a pump 280 which receives the moisture extracted from the room through the pipe 209b and discharges it through the pipe 281 to the wick means 282 placed on the exterior of the room. The moisture is thus pumped to the wick where it evaporates.

In all the modifications, the motors may be controlled by proper controls similar to those described for Fig. 1. Also, if desired, fresh air from the exterior may be introduced into the air conditioning passageways in addition to, or in lieu of the air from the enclosure.

While the forms of embodiment of the invention as herein disclosed, constitute preferred forms, it is to be understood that other forms might be adopted, all coming within the scope of the claims which follow.

What is claimed is as follows:

1. An air conditioning apparatus for an enclosure, an evaporator exposed to the air within said enclosure, a refrigerant liquefying unit in said enclosure insulated from said air and connected to said evaporator, means for creating a current of air past said refrigerant liquefying unit and discharging the current outside said enclosure, drain means for moisture extracted from the air within said enclosure by said evaporator, and means for conveying moisture from said drain means to the exterior of said enclosure and evaporating said moisture in said exterior, and including a wick-like member exposed to the atmosphere outside of said enclosure, means for distributing said moisture on said wick.

2. The method of disposing of condensate formed in a cooler unit which consists in conveying the condensate to the exterior of the compartment to be cooled, forcing a blast of air from said compartment to the exterior of said compartment, and releasing said condensate to said blast of air outside of said enclosure.

3. In combination with a self-contained air conditioning apparatus mounted in a room, two air ducts leading to the exterior of said room, means circulating a current of air in through the first duct past the heat dissipating unit of said air conditioning apparatus and out through the second duct, means including a third and smaller duct passing through said second duct for conveying condensate to the exterior of the room.

4. In an air conditioner for a room, a cabinet having a portion within said room and having a portion projecting beyond the outer wall of said room, an evaporator disposed in said cabinet exposed to the main air body in said room, a refrigerant liquefying unit in said cabinet insulated from said main air body and connected to said evaporator, said refrigerant liquefying unit including a fan, means for conveying moisture extracted from said air by said evaporator to the exterior of said room, and means for evaporating said moisture in said exterior.

5. The method of disposing of condensate formed in a cooler unit which consists in conveying the condensate to the exterior of the compartment being cooled, forcing a blast of air through the cooling unit and to the exterior of said compartment, and releasing said condensate to said blast of air outside of said compartment while more condensate is being removed from the air in said compartment in liquid form.

6. In combination with a self-contained, air conditioning unit for a room, two ducts one of which is within the other and attached to and extending from a portion of said unit adapted to be located in a room to a point exteriorly of said room, said unit including a heat absorbing unit for cooling the room air and means for dissipating heat absorbed thereby, means expelling hot air passed over said heat dissipating means through one duct and means expelling condensate collected from the room air by said heat absorbing means and discharging the condensate through the other duct.

7. A self-contained, unitary, encased air conditioning apparatus for a room, comprising an air duct communicating at spaced-apart points with the air exteriorly of said room, refrigeration apparatus including an evaporator adapted to cool the room air and a condensing unit separated from the room air, means circulating a current of air through said duct in heat exchange relation with said condensing unit of said air conditioning apparatus and back to the exterior air, and means including a second and smaller duct passing through said first mentioned duct for conveying condensate to the exterior of the room.

8. In an air conditioner for a room, a cabinet, an evaporator within said cabinet exposed to the main air body in said room, a refrigerant liquefying unit including a fan in said cabinet insulated from said main air body and connected to said evaporator, means for conveying moisture extracted from said air by said evaporator to the exterior of said room, and means for evaporating said moisture in said exterior, said last named means utilizing heat given off by said refrigerant liquefying unit.

NELSON J. SMITH.